(12) United States Patent
Sloane et al.

(10) Patent No.: US 11,558,362 B2
(45) Date of Patent: *Jan. 17, 2023

(54) SECURE COMMUNICATION FOR REMOTE DEVICES

(71) Applicant: BANK OF AMERICA CORPORATION, Charlotte, NC (US)

(72) Inventors: Brandon Sloane, Santa Barbara, CA (US); Regina Yee Cadavid, San Gabriel, CA (US); Gloria Joo, Moorpark, CA (US); Jinyoung Nathan Kim, Charlotte, NC (US); Nia Mack, Addison, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 157 days.

This patent is subject to a terminal disclaimer.

(21) Appl. No.: 16/890,565

(22) Filed: Jun. 2, 2020

(65) Prior Publication Data

US 2021/0377238 A1    Dec. 2, 2021

(51) Int. Cl.
*H04L 9/40*     (2022.01)
*H04L 9/32*     (2006.01)
(Continued)

(52) U.S. Cl.
CPC ............ *H04L 63/08* (2013.01); *H04L 9/3242* (2013.01); *H04L 63/061* (2013.01);
(Continued)

(58) Field of Classification Search
CPC ..... H04L 63/08; H04L 9/3242; H04L 63/061; H04L 45/00; H04L 45/04; H04W 12/0471; H04W 12/069
See application file for complete search history.

(56) References Cited

U.S. PATENT DOCUMENTS 6,275,587 B1    8/2001 Amerige
6,996,712 B1 *  2/2006 Perlman ................ H04L 9/3247
                                          380/268
(Continued)

OTHER PUBLICATIONS

Norzima Elbegbayan "Winnowing, a Document Fingerprinting Algorithm", 2005, Department of Computer Science, Linkoping University, 8 pages (Year: 2005).*
(Continued)

*Primary Examiner* — Catherine Thiaw
(74) *Attorney, Agent, or Firm* — Moore & Van Allen PLLC; Jeffrey R. Gray (57) ABSTRACT

A security system that provides for secure communication from a remote system operating on an unsecure network without the need for encrypting the packets related to the communication. The packets for the communications are sent over the network in clear text, which are readable by any systems on the network, however, only the systems that are authorized are able to determine what packets are the correct packets and what packets are the imitation packets. Moreover, a remote secure network may be utilized such that any system operating on an unsecure network may send packets through the remote secure network in a randomized routing in order to aid in hiding the systems sending and receiving the packets and the relays through which the packets are being sent.

20 Claims, 4 Drawing Sheets

(51) Int. Cl.
*H04L 45/02* (2022.01)
*H04W 12/0471* (2021.01)
*H04W 12/069* (2021.01)

(52) U.S. Cl.
CPC ..... *H04W 12/0471* (2021.01); *H04W 12/069* (2021.01); *H04L 45/04* (2013.01)

(56) References Cited

U.S. PATENT DOCUMENTS

| | | | |
|---|---|---|---|
| 7,328,457 | B1 | 2/2008 | Mister |
| 7,512,986 | B2 | 3/2009 | Shen-Orr et al. |
| 7,813,506 | B2 | 10/2010 | Moskowitz et al. |
| 7,920,702 | B2 | 4/2011 | Shen-Orr et al. |
| 8,046,841 | B2 | 10/2011 | Moskowitz et al. |
| 8,160,249 | B2 | 4/2012 | Moskowitz et al. |
| 8,272,051 | B1 | 9/2012 | Zhao et al. |
| 8,351,605 | B2 | 1/2013 | Bandholz et al. |
| 8,391,485 | B2 | 3/2013 | Bandholz, Sr. et al. |
| 8,578,480 | B2 | 11/2013 | Judge et al. |
| 8,948,386 | B2 * | 2/2015 | Campagna ............ H04L 9/0844 380/247 |
| 10,305,689 | B2 | 5/2019 | Araki |
| 11,153,276 | B1 * | 10/2021 | Keyerleber ......... H04L 63/0272 |
| 2005/0246769 | A1 * | 11/2005 | Bao ........................ H04L 63/08 726/16 |
| 2007/0245417 | A1 | 10/2007 | Lee et al. |
| 2010/0033305 | A1 * | 2/2010 | Korgaonkar ............. H04K 3/28 340/10.1 |
| 2011/0238997 | A1 * | 9/2011 | Bellur .................. H04L 9/3242 713/176 |

OTHER PUBLICATIONS

Ng Chin Go n g and Azman Samsudin "Incoercible Secure Electronic Voting Scheme Eligibility Non-reusability Non-traceability", IEEE, 8 pages (Year: 2003).*

43. Excerpts from: A. Menezes, P. van Oorschot, and S. Vanstone, Handbook of Applied Cryptography, CRC Press, 1996. (Year: 1996).*

Ronald L. Rivest. "Chaffing and Winnowing: Confidentiality without Encryption." MIT Lab for Computer Science. Mar. 18, 1998 (rev. Jul. 1, 1998). http://people.csail.mit.edu/rivest/chaffing-980701.txt.

https://en.wikipedia.org/wiki/Chaffing_and_winnowing.

* cited by examiner

PROVIDE A PRE-SHARED KEY AND ALGORITHM TO A USER COMPUTER SYSTEM OF USER THAT WILL COMMUNICATE WITH A FIRST NETWORK (E.G., A HOME NETWORK) THROUGH A SECOND NETWORK (E.G., AN ALTERNATE NETWORK THAT MAY BE AN UNSECURED NETWORK)
110

A SENDING SYSTEM (E.G., FROM AN AGENT) CREATES A PLURALITY OF PACKETS FOR A COMMUNICATION, WHEREIN THE PLURALITY OF PACKETS COMPRISE ONE OR MORE WHEAT PACKETS AND ONE OR MORE CHAFF PACKETS (E.G., ONE OR MORE CHAFF PACKETS COMPRISE IMITATION PACKETS OR PAST OR CURRENT WHEAT PACKETS UNRELATED TO THE COMMUNICATION BEING SENT)
120

THE SENDING SYSTEM ATTACHES A WHEAT SIGNATURE TO EACH OF THE WHEAT PACKETS (E.G., THE SIGNATURE MAY BE CREATED USING A PRE-SHARED KEY AND ALGORITHM, AND/OR AT LEAST A PORTION OF THE WHEAT PACKET)
130

THE CHAFF PACKETS INCLUDE A CHAFF SIGNATURE (E.G., THE CHAFF SIGNATURE MAY BE AN IMITATION SIGNATURE OR MAY BE WHEAT SIGNATURE FROM A DIFFERENT COMMUNICATION
140

THE PLURALITY OF PACKETS (E.G., WHEAT PACKETS AND CHAFF PACKETS) ARE ROUTED FROM THE REMOTE NETWORK (E.G., UNSECURED NETWORK) TO THE HOME NETWORK THROUGH ONE OR MORE INTERMEDIATE NETWORKS (E.G., DIFFERENT PACKETS ARE ROUTED TO THE HOME NETWORK ALONG WITH OTHER USER'S ACCESSING THE HOME NETWORK FROM OTHER REMOTE NETWORKS)
150

A RECEIVING SYSTEM ON THE HOME NETWORK RECEIVES THE PLURALITY OF PACKETS FOR THE COMMUNICATION AND DETERMINES A VALIDATED SIGNATURE FOR EACH OF THE PLURALITY OF PACKETS (E.G., REPLICATES A RECEIVED SIGNATURE FROM EACH OF THE PLURALITY OF PACKETS)
160

WHEN THE VALIDATED SIGNATURE MEETS THE RECEIVED SIGNATURE THE PACKETS ARE IDENTIFIED AS WHEAT PACKETS (E.G., THE PRE-SHARED KEY AND ALGORITHM AND/OR A PORTION OF THE PACKET RESULTS IN THE SAME SIGNATURE AS THE RECEIVED SIGNATURE)
170

WHEN THE VALIDATED SIGNATURE FAILS TO MEET THE RECEIVED SIGNATURE THE PACKETS ARE CHAFF PACKETS AND DISCARDED (E.G., THE PRE-SHARED KEY AND ALGORITHM AND/OR A PORTION OF THE PACKET RESULTS IN A DIFFERENT SIGNATURE AS THE RECEIVED SIGNATURE)
180

THE ONE OR MORE WHEAT PACKETS ARE ASSEMBLED, IF NECESSARY, INTO THE COMMUNICATION (E.G., THE WHEAT PACKETS MAY BE ASSEMBLED USING THE PRE-SHARED KEY, THE ALGORITHM, A PORTION OF THE PACKETS THEMSELVES, AND/OR ANOTHER FEATURE)
190

ANY SYSTEMS ON THE OUTSIDE NETWORKS AND/OR THE INTERMEDIATE NETWORKS WILL BE ABLE TO REVIEW THE PLAIN TEXT OF THE PACKET, BUT WILL NOT BE ABLE TO DETERMINE WHAT PACKETS ARE WHEAT PACKETS AND/OR WHAT PACKETS ARE CHAFF PACKETS
195

SECURE COMMUNICATION FOR REMOTE DEVICES

FIELD

The present invention relates to a security system, and more particularly to a security system that allows a system operating on an unsecure network to communicate securely with systems on a home network without encrypting the communication.

BACKGROUND

In order to send secure communications, typical communications are encrypted utilizing a session key. Only the parties with the session key are able to read the communications. Should any party have access to the session key, the party can review the communication that was encrypted using the session key.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

Generally, systems, computer products, and methods are described herein for a security system that provides for secure communication from a remote system operating on an unsecure network without the need for encrypting the packets related to the communication. The packets for the communications are sent over the network in clear text, which are readable by any systems on the network; however, only the systems that are authorized are able to determine what packets are the correct packets and what packets are the imitation packets. Moreover, a remote secure network may be utilized such that any system operating on an unsecure network may send packets through the remote secure network in a randomized routing in order to aid in hiding the systems sending and receiving the packets and the relays through which the packets are being sent.

Embodiments of the invention comprise securely receiving communications from outside of a first network. The invention comprises providing a pre-shared key to a sending system on the first network. The sending system will communicate with one or more first systems on the first network from a second network. The sending system creates a plurality of packets for a communication, and the plurality of packets comprise one or more wheat packets each having a wheat signature or one or more chaff packets each having a chaff signature. The plurality of packets for the communication are sent from the second network to the one or more first systems on the first network. The receiving system receives the plurality of packets for the communication. The receiving system determines a validated signature for each of the plurality of packets. The receiving system identifies the one or more chaff packets when the one or more chaff packets have the chaff signature that fails to meet the validated signature and discards the one or more chaff packets. The receiving system identifies the one or more wheat packets when the one or more wheat packets have the wheat signature that meets the validated signature. Thereafter, the receiving system determines the communication from the sending system from the one or more wheat packets. The one or more second systems on the second network are prevented from determining the communication from the sending system without the validated signature and without identifying the one or more wheat packets or the one or more chaff packets from the plurality of packets.

In further accord with embodiments of the invention, determining the validated signature comprises replicating a received signature for the plurality of packets, wherein the received signature is the chaff signature of the one or more chaff packets or the wheat signature of the one or more wheat packets.

In other embodiments of the invention, the received signature comprises a message authentication code (MAC), and replicating the MAC comprises using the pre-shared key and an algorithm to create the validated signature.

In still other embodiments of the invention, the algorithm is a pre-shared algorithm that is shared with the sending system when the sending system is on the first network.

In yet other embodiments of the invention, replicating the received signature further comprises using at least a portion of the plurality of packets to create the validated signature.

In other embodiments of the invention, the sending system creates the wheat signature for the one or more wheat packets.

In further accord with embodiments of the invention, the wheat signature is created from the pre-shared key, an algorithm, and a portion of a wheat packet of the one or more wheat packets.

In other embodiments of the invention, the sending system creates the one or more chaff packets using imitation content and imitation signatures.

In still other embodiments of the invention, the one or more chaff packets appear to be related to a legitimate communication.

In yet other embodiments, the sending system creates the one or more chaff packets using content and validated signatures from one or more unrelated communications.

In other embodiments of the invention, the one or more chaff packets are from legitimate communications.

In further accord with embodiments of the invention, the plurality of packets for the communication are sent from the second network to the one or more first systems on the first network through a remote secure network.

In other embodiments of the invention, the plurality of packets for the communication are sent from the remote secure network using a randomized routing of the plurality of packets.

To the accomplishment the foregoing and the related ends, the one or more embodiments comprise the features hereinafter described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Having thus described embodiments of the invention in general terms, reference will now be made to the accompanying drawings, and wherein:

FIG. 4 illustrates a process flow for providing secure communications without encryption from potentially unsecure networks, in accordance with some embodiments of the present disclosure.

DETAILED DESCRIPTION OF EMBODIMENTS OF THE INVENTION

Embodiments of the invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Systems, methods, and computer program products are described herein for a security system that provides for secure communication from a remote system operating on an unsecure network without the need for encrypting the packets related to the communication. The packets for the communications are sent over the network in clear text, which are readable by any systems on the network, however, only the systems that are authorized are able to determine what packets are the correct packets and what packets are the imitation packets. Moreover, a remote secure network may be utilized such that any system operating on an unsecure network may send packets through the remote secure network using a randomized routing in order to aid in hiding the systems sending and receiving the packets and the relays through which the packets are being sent.

Figure 1:
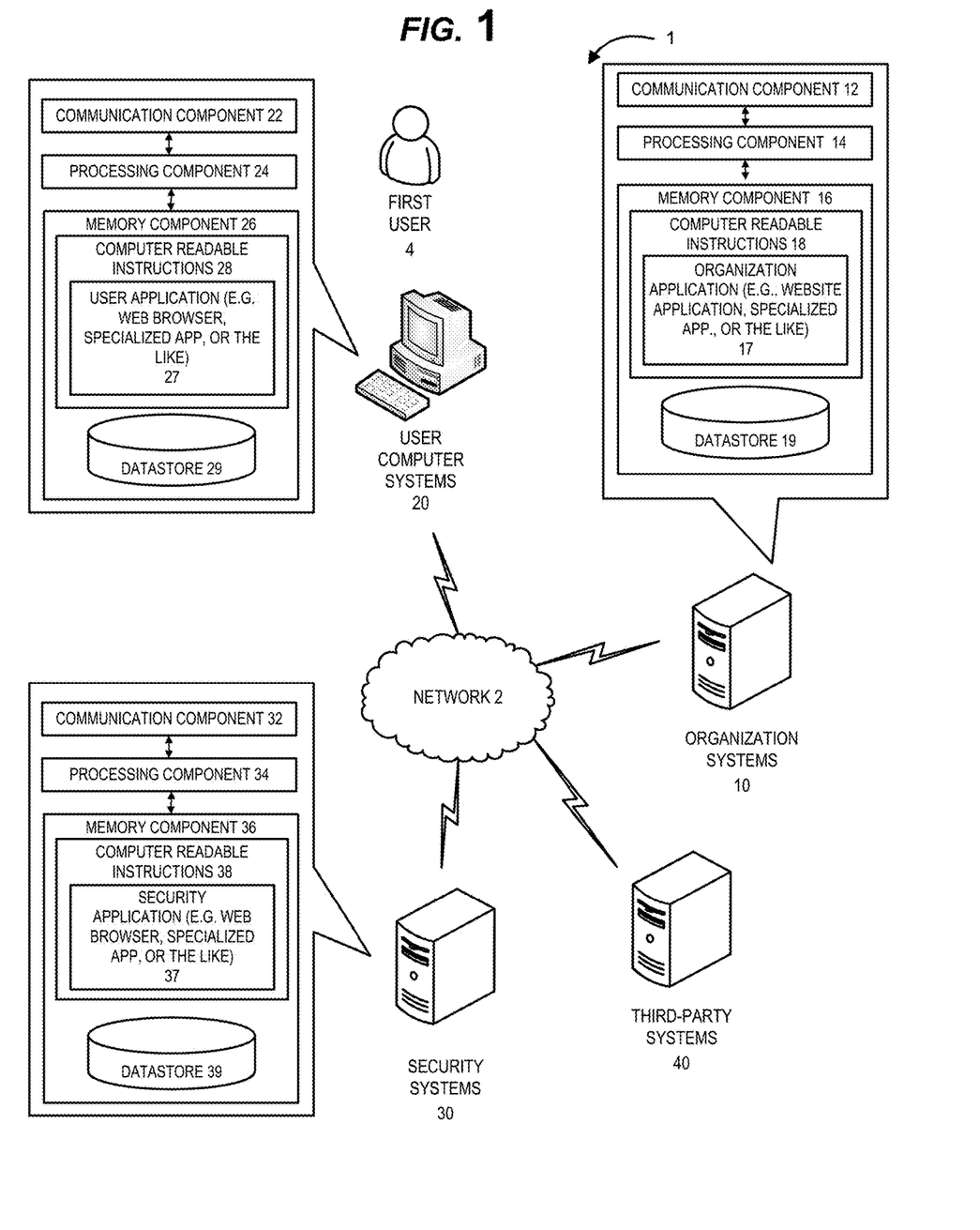
FIG. 1 illustrates a block system diagram of a network security system, in accordance with some embodiments of the present disclosure.

FIG. 1 illustrates a network security system environment 1, in accordance with embodiments of the present disclosure. As illustrated in FIG. 1, one or more organization systems 10 are operatively coupled, via a network 2, to one or more user computer systems 20, one or more security systems 30, one or more third-party systems 40, and/or one or more other systems (not illustrated). In this way, the security systems 30 (in coordination with the user computer systems 20 and/or other systems on the network) may be utilized to create secure communications over the network 2 without the need to encrypt all or a majority of the communications between the systems on the network 2. As will be described herein, the security systems 30 and/or other systems described herein may utilize security signatures (e.g., keys, MACs, algorithms, and/or the like) attached to packets to allow a receiving system to identify the valid packets for a communication. For example, the security systems 30 and/or other systems (e.g., user computer systems 20) may create and/or assign one or more keys (e.g., pre-shared keys, such a global network keys, content keys, segmentation keys, or the like) and one or more algorithms (e.g., pre-shared algorithm, or the like). The one or more keys and the one or more algorithms may be utilized to create message authentication codes (MACs) for each of the packets being sent, in particular, wheat packets, as will be discussed herein. Moreover, chaff packets (e.g., unrelated real packets, imitation packets, combinations thereof, or the like) and wheat packets (e.g., real packets, or the like) may be used when sending communications. Any receiving system must be able to identify the security signature in order to determine what packets are wheat packets to determine the communication and what packets are chaff packets that should be discarded. For example, each receiving system may have the key (e.g., pre-shared key) and the one or more algorithms in order to determine what MAC attached to a packet is valid, and thus, identify what packets are wheat packets and what are chaff packets that can be discarded (e.g., a technique that may be described as winnowing). The wheat packets can then be identified as the legitimate communication. In addition, the communication may be broken up into a plurality of wheat packets before the security signature is added, and as such, the receiving system may also have to reassemble the plurality of wheat packets together in order to identify the communications. While security is achieved through keys, algorithms, splitting packets, or the like, the messages themselves are sent over the network 2 without any encryption, as will be described in further detail herein.

The communications that may utilize the embodiments of the present disclosure, may include any type of communication such as, but not limited to, communication related to a computer system trying to access a network, communications between segmented computer systems within a network trying to communicate with other computer systems within the same segment, computer systems trying to communication with systems on other networks, or the like. The communications may relate to interactions, accessing data, running applications, sending messages, or the like, as will be discussed in further detail herein.

The network 2 may be a global area network (GAN), such as the Internet, a wide area network (WAN), a local area network (LAN), or any other type of network or combination of networks. The network 2 may provide for wireline, wireless, or a combination of wireline and wireless communication between systems, services, components, and/or devices on the network 2.

As illustrated in FIG. 1, the one or more organization systems 10 generally comprise one or more communication components 12, one or more processing components 14, and one or more memory components 16. The one or more processing components 14 are operatively coupled to the one or more communication components 12 and the one or more memory components 16. As used herein, the term "processing component" generally includes circuitry used for implementing the communication and/or logic functions of a particular system. For example, a processing component may include a digital signal processor component, a microprocessor component, and various analog-to-digital converters, digital-to-analog converters, and other support circuits and/or combinations of the foregoing. Control and signal processing functions of the system are allocated between these processing components according to their respective capabilities. The one or more processing components may include functionality to operate one or more software programs based on computer-readable instructions thereof, which may be stored in the one or more memory components.

The one or more processing components 14 use the one or more communication components 12 to communicate with the network 2 and other components on the network 2, such as, but not limited to, the components of the one or more user computer systems 20, the one or more security systems 30, the one or more third-party systems 40, and/or the one or more other systems (not illustrated). As such, the one or more communication components 12 generally comprise a wireless transceiver, modem, server, electrical connection, electrical circuit, or other component for communicating with other components on the network 2. The one or more communication components 12 may further include an interface that accepts one or more network interface cards, ports for connection of network components, Universal Serial Bus (USB) connectors, or the like.

As further illustrated in FIG. 1, the one or more organization systems 10 comprise computer-readable instructions 18 stored in the one or more memory components 16, which in some embodiments includes the computer-readable instructions 18 of the one or more organization applications 17 (e.g., secure website application, secure dedicated application, or the like). In some embodiments, the one or more memory components 16 include one or more data stores 19 for storing data related to the one or more organization systems 10, including, but not limited to, data created, accessed, and/or used by the one or more organization applications 17. The organization may be an entity that administers, controls, or regulates the network 2, user computer systems 20, the security systems 30, and/or the third-party systems 40. It should be understood that the users 4, third-parties, and organizations may all be referred to herein as entities.

As illustrated in FIG. 1, users 4 may communicate with each other over the network 2 as will be described in further detail herein. In some embodiments the security system 30 may be used to secure the communications over the network 2 and/or in some embodiments each of the systems on the network 2 may include a portion of the security systems 30 and/or application 37 thereof, such as an agent that may communicate with each of the computer systems or be located, at least partially (or entirely), on each of the computer systems 20. It should be understood that the user 4 may be a user that is communicating with other users on the network 4 through the use of the user computer systems 20. The user 4 may be representing himself/herself in a communication, a user 4 representing a third-party in an interaction, a user 4 that acts on behalf of the organization, a user 4 that acts on behalf of the security system 30, and/or the like. Consequently, the one or more users 4 may be individual users and/or employees, agents, representatives, officers, or the like of any entity on the network 2. In particular embodiments, the network 2 may be a network of an organization (e.g., a business) and the users 4 are the employees, agents, officers, or the like of the business.

As such, the user computer systems 20 may communicate with each other, the one or more organization systems 10, the one or more security systems 30, the one or more third-party systems 40, and/or other systems (not illustrated). The one or more user computer systems 20 may be a desktop, laptop, tablet, mobile device (e.g., smartphone device, or other mobile device), or any other type of computer that generally comprises one or more communication components 22, one or more processing components 24, and one or more memory components 26.

The one or more processing components 24 are operatively coupled to the one or more communication components 22, and the one or more memory components 26. The one or more processing components 24 use the one or more communication components 22 to communicate with the network 2 and other components on the network 2, such as, but not limited to, the one or more organization systems 10, the one or more security systems 30, the one or more third-party systems 40, and/or the other systems (not illustrated). As such, the one or more communication components 22 generally comprise a wireless transceiver, modem, server, electrical connection, or other component for communicating with other components on the network 2. The one or more communication components 22 may further include an interface that accepts one or more network interface cards, ports for connection of network components, Universal Serial Bus (USB) connectors and the like. Moreover, the one or more communication components 22 may include a keypad, keyboard, touch-screen, touchpad, microphone, mouse, joystick, other pointer component, button, soft key, and/or other input/output component(s) for communicating with the users 4.

As illustrated in FIG. 1, the one or more user computer systems 20 may have computer-readable instructions 28 stored in the one or more memory components 26, which in some embodiments includes the computer-readable instructions 28 for user applications 27, such as dedicated applications (e.g., apps, applet, or the like), portions of dedicated applications, a web browser or other apps that allow access to applications located on other systems, or the like. In some embodiments, the one or more memory components 26 include one or more data stores 29 for storing data related to the one or more user computer systems 20, including, but not limited to, data created, accessed, and/or used by the one or more user computer systems 20. The user application 27 may use the applications of the one or more organization systems 10, the one or more security systems 30, the one or more third-party systems 40, and/or one or more other systems (not illustrated) in order to communicate with other systems on the network and take various actions in a secure way without having to encrypt all or the majority of the communications over the network 2.

As illustrated in FIG. 1, one or more security systems 30 may be utilized by the one or more organization systems 10, the one or more user computer systems 20, the one or more third party systems 40, and/or other systems to aid in providing secure communications without requiring encryption of all or most of the communications. That is, the security system 30 may be utilized in order to create, store, manage or the like the keys (e.g., pre-shared keys, such as global keys, segmentation keys, specific communication keys, or the like) and/or the algorithms (e.g., MAC algorithms used to create the MACs), and/or communicate with the systems (e.g., the agents thereon, or the like) on the network 2 to facilitate the secure communications.

As such, the one or more security systems 30 are operatively coupled, via a network 2, to the one or more organization systems 10, the one or more user computer systems 20, the one or more third-party systems 40, and/or the other systems (not illustrated). The one or more security systems 30 generally comprise one or more communication components 32, one or more processing components 34, and one or more memory components 36.

The one or more processing components 34 are operatively coupled to the one or more communication components 32, and the one or more memory components 36. The one or more processing components 34 use the one or more communication components 32 to communicate with the network 2 and other components on the network 2, such as, but not limited to, the components of the one or more organization systems 10, the one or more user computer systems 20, the one or more third-party systems 40, and/or the one or more other systems (not illustrated). As such, the one or more communication components 32 generally comprise a wireless transceiver, modem, server, electrical connection, or other component for communicating with other components on the network 2. The one or more communication components 32 may further include an interface that accepts one or more network interface cards, ports for connection of network components, Universal Serial Bus (USB) connectors and the like.

As illustrated in FIG. 1, the one or more security systems 30 may have computer-readable instructions 38 stored in the one or more memory components 36, which in one embodiment includes the computer-readable instructions 38 of one or more security applications 37. In some embodiments, the one or more memory components 36 include one or more data stores 39 for storing data related to the one or more security systems 30, including, but not limited to, data created, accessed, and/or used by the one or more security applications 37. The one or more security applications 37 may allow for creating, storing, managing, or the like of the keys (e.g., pre-shared keys, such as global keys, segmentation keys, communication keys, or the like) and/or the one or more algorithms (e.g., MAC algorithms, or the like), and/or communicate with the systems (e.g., the agents thereon, or the like) on the network 2 to facilitate the secure communications. In some embodiments, the one or more security systems 30 may be operated by the organization (e.g., be one of the one or more organization systems 10), or may be operated by a third-party on behalf of the organization.

Moreover, as illustrated in FIG. 1, the one or more third-party systems 40 are operatively coupled to the one or more organization systems 10, the one or more user computer systems 20, the one or more security systems 30, and/or the one or more other systems, through the network 2. The one or more third-party systems 40, and/or other like systems have components the same as or similar to the components described with respect to the one or more organization systems 10, the one or more user computer systems 20, and/or the one or more security systems 30 (e.g., one or more communication components, one or more processing components, and one or more memory devices with computer-readable instructions of one or more third-party applications, one or more datastores, or the like). Thus, the one or more third-party systems 40 communicate with the one or more organization systems 10, the one or more user computer systems 20, the one or more security systems 30, and/or each other in same or similar way as previously described with respect to the one or more organization systems 10, the one or more user computer systems 20, and/or the one or more security systems 30. The one or more third-party systems 40 may comprises the systems and applications that are trying to access the network 2 (e.g., as authorized parties, unauthorized parties, or the like). As such, in some embodiments the third-parties may be unauthorized third-parties that are trying to misappropriate communications between authorized systems on the network 2. In some embodiments, the third-parties are authorized to access the network 2 for various reasons (e.g., to perform maintenance, enter interactions, support the organization systems or the like). In still other embodiments, the third-parties may be external systems on external secure networks that aid in allowing authorized users 4 (e.g., users that are located outside of the network 2, such as out of the country) to access the network 2 from abroad.

The one or more other systems (not illustrated) may include the systems, and components thereof, for allowing communications between the systems (e.g., intermediaries that act as gateways, APIs, or the like to allow communication between the systems).

Figure 2:
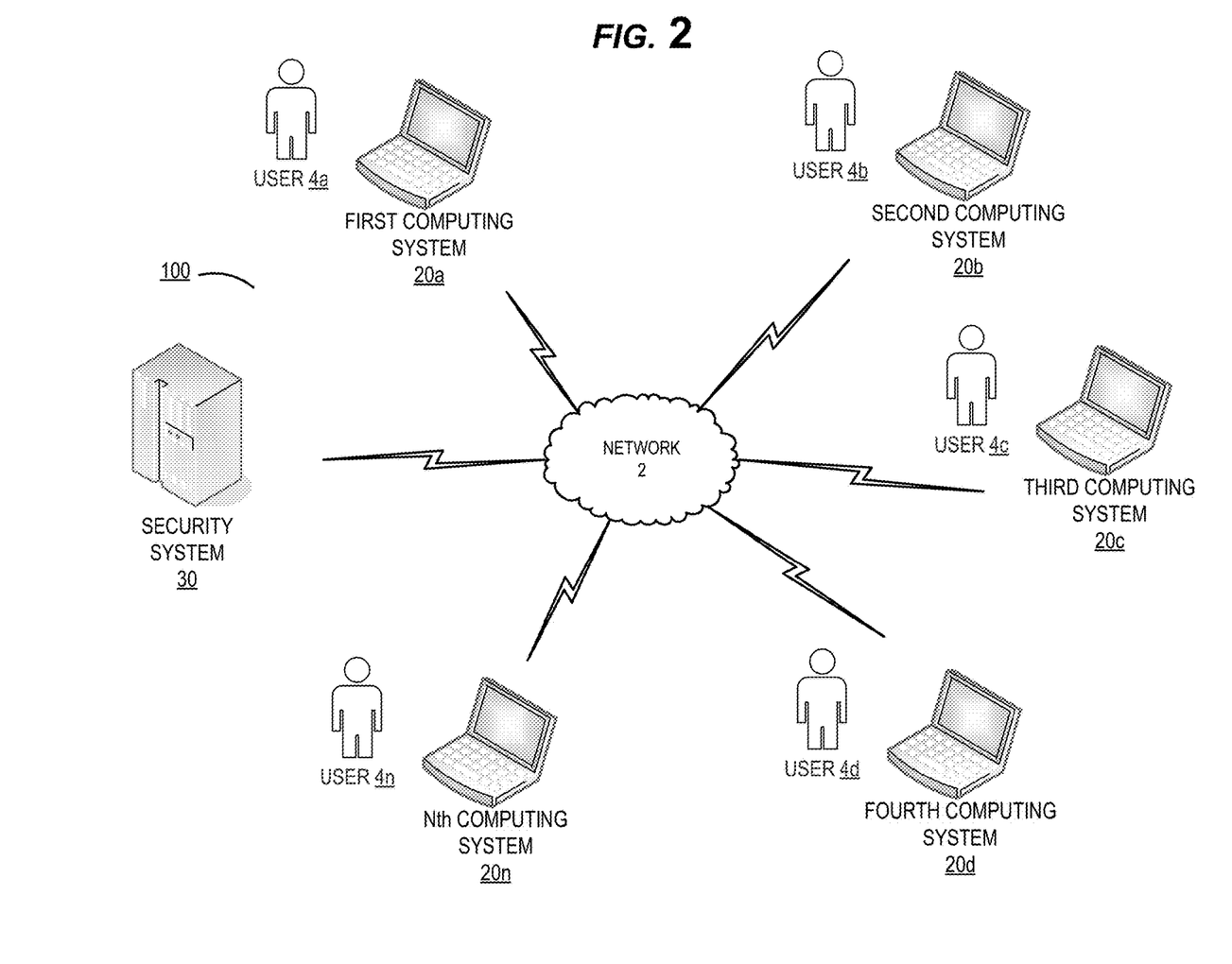
FIG. 2 illustrates a network environment for providing secure communications without encryption over the network, in accordance with some embodiments of the present disclosure.

FIG. 2 illustrates a network environment 100 in which multiple entity computer systems (e.g., user computer systems 20), and entities (e.g., users 4) associated therewith, communicate with each other and other systems, including, but not limited to the security systems 30, the organization systems 10, or the like. The communications between the systems 20 may be secured communications, as will be described in further detail below. The network environment 200 may be any type of network 2, such as an internal network, external network, cross-organizational network, or any type of network of entity computer systems. In some embodiments the network may be a single network; however, in some embodiments while the network is a single network, it may have two or more segmented networks that may be regulated based on signatures (e.g., MAC that are created and identified using keys and/or algorithms) attached to packets. As such, even though a systems may be able to access the network 2, the system may not be able to communicate with other systems on the network (e.g., the system may not be able to create signatures that other systems can validate and/or the system may not be able to read signatures created by other systems on the network 2). As illustrated in FIG. 2, the network 2 may comprise a first entity computer system 20a, a second entity computer system 20b, a third entity computer system 20c, a fourth entity computer systems 20d, up to an $n^{th}$ entity computer system 20n. As further illustrated in Figures the computer systems 20a to $20n^{th}$ may correspond with entities, such as a first user 4a, a second user 4b, a third user 4c, a fourth user 4d, an nth user 4n, or the like. As will be discussed in further detail herein with respect the systems on the network 2, the systems may send and receive secure communications using wheat packets and chaff packets.

The present disclosure provides an improved way for sending communications between systems in secure way in order to restrict unauthorized third-party systems from accessing the network 2, and if they gain access to the system, to restrict such third-party systems from being able to intercept and identify the correct communication to misappropriate the communications. Furthermore, the present disclosure provides an improved way to allow for external users (e.g., travelers) to other countries operating outside of the network 2 (e.g., home network) to access the network 2 from an external unsecured network and to communicate with the systems on the network 2. In some embodiments, the users 4 operating on an unsecured network 3 may send communications through a remote secure network 5, which in addition to using wheat packets and chaff packets, may also obfuscate the routing of the packets and/or the IP addresses of the sending systems and the receiving systems. The present disclosure also allows for providing segmentation of the systems on the network 2 using different signatures (e.g., different keys and/or algorithms) to only allow sub-sets of the systems on the network 2 to communicate with each other.

The present invention utilizes and expands upon a chaffing communication technique that is utilized to provide confidential communication between systems on a network 2. Communication between systems may involve the sending systems creating and/or sending packets to the receiving system. The packets may comprise wheat packets (e.g., authorized packets, valid packets, or the like) and chaff packets (e.g., unauthorized packets, imitation packets, or the like), and the receiving system authenticates the signatures on the packets and separates the chaff packets from the wheat packets. The wheat packets may include the actual communication (e.g., message, process instructions, file, data, or the like) and/or portions thereof, while the chaff packets are the imitation communication and/or portions thereof.

The packets (e.g., wheat and chaff packets) are sent with authentication in form of a signature. The signature may be any type of secure signature that may be used to determine the packets that are wheat packets, how to assemble the wheat packets (if necessary), and/or what and/or how to use one or more keys and/or one or more algorithms (if necessary) in order to read the packets. For example, the signature may be an MAC that is created using a key (e.g., a pre-shared key), a MAC algorithm, and in some embodiments the packet itself (e.g., content of the communication, serial number of the wheat packets, both of the forgoing, and/or the like). For example, the key and at least a portion of the packet are inputs into the MAC algorithm, and the output of the MAC algorithm is the MAC that is attached to the wheat packet. The security system 30, and/or individual agents (e.g., pre-loaded applications, or portions thereof) that are located on each system, may be responsible for creating the wheat packets with the signature (e.g., authorized signature) and the chaff packets with an imitation signature, as will be described herein in further detail.

The receiving system may use the signature in order to determine what packets are wheat packets and what packets are chaff packets that can be discarded. For example, a receiving computer system receiving the packets (e.g., wheat packets, chaff packets, sub-portions thereof, or the like) may only be able to identify the correct communication using the key (e.g., pre-shared key) and/or a portion of the packet and the MAC algorithm. That is, the receiving system may try to recreate the MAC of a packet using the pre-shared key, the MAC algorithm and/or a portion of the packet (e.g., pre-agreed upon serial number, content section, or the like of the packet). If the comparison between the determined MAC recreated by the receiving party meets the MAC of the packet received by the receiving party then packet is determined to be a wheat packet. Alternatively, when the determined MAC of a packet recreated by the receiving system fails to meet the MAC of the packet received by the receiving system, the packet is a chaff packet and is discarded.

It should be understood that any entity on the system can read any packet (e.g., the packet is not encrypted, hidden, or the like); however, the receiving system can only identify the correct packets based on validating the signature attached to each packet (e.g., recreating the MAC signature).

As will be further described herein, in some embodiments of the invention, the chaff packets may be chaff packets generated (e.g., made up) by the sending computer systems or the security system 30. Alternatively, the chaff packets may be past or current wheat packets that were used for other communications outside of the present communication. By using unrelated wheat packets as the chaff packets, the systems are not required to generate chaff packets for the communications, which may reduce processing capacity and/or memory requirements, as well as increase processing speeds. The chaff packets may look like the wheat packets (e.g., correct format, have serial numbers, and have content, or the like), but the chaff packets have imitation signatures (e.g., MACs, or the like) that are not valid and cannot be recreated using the correct key and/or the correct algorithm (e.g., the pre-shared key and pre-shared algorithm).

In addition to sending chaff packets, the communications described herein may further include separating the packets (e.g., wheat and/or chaff packets) into multiple wheat packets (e.g., sub-wheat packets, or the like) which are each individually authenticated by adding the signature (e.g., MACs, or the like) to each of the sub-wheat packets. The separated sub-wheat packets may include serial numbers, which may function to both create the signature (e.g., the MACs), as well as allow the receiving system to reassemble the sub-wheat packets into the full wheat packet in the proper order. Consequently, the receiving system may use the signature of the multiple wheat packets (e.g., sub-wheat packets), as previously discussed herein, to identify the multiple wheat packets, remove the chaff packets with imitation signatures, and reassemble the multiple wheat packets (e.g., sub-wheat packets) into the full wheat packet in order to read the communication.

Figure 3:
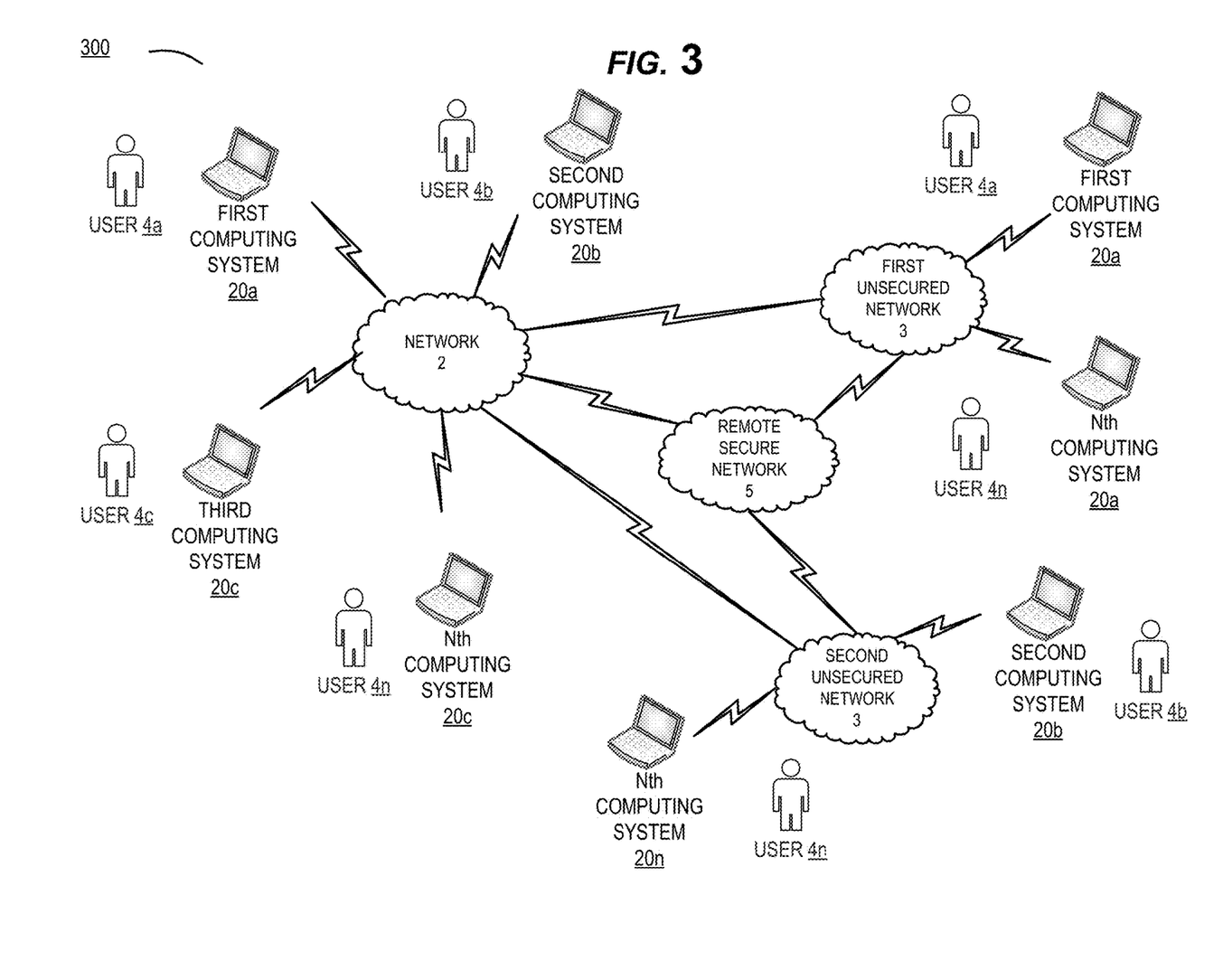
FIG. 3 illustrates a cross-network environment for providing secure communications without encryption on potentially unsecure networks, in accordance with some embodiments of the present disclosure.

FIG. 3 provides a secure remote network environment 300, in which users 4 (e.g. a first user 4a, a second user 4b, or the like, such as a traveler) may try to access the network 2 (e.g., a home network 2), from a remote network, such as an unsecured network 3 (e.g., a first unsecured network 3, a second unsecured network 3). The users (e.g., a first user 4a, a second user 4b, or the like) may be traveling away from the home network 2, but may want to communicate with the home network 2. As such, the users may try to communicate with the home network 2 directly from the unsecured networks 3 using the chaff packets as previously described herein. It should be understood, as will be described in further detail with respect to FIG. 4, the security systems and techniques previously described herein may be utilized in order to allow for secure communication from a user 4 (e.g., a first user 4a, a second user 4b, or the like) trying to communicate with the network 2 (e.g., home network) from another network (e.g., from a first unsecured network 3, a second unsecured network 3, or the like). That is, should a user 4 be planning on using networks that may be potentially unsecure (e.g., networks outside of the organization, networks of countries that do not allow encryption, or the like), then the user computer system 20 may be preloaded with the agent application to utilize one or more wheat packets and one or more chaff packets in order to send communications to the home network 2.

Moreover, users (e.g., a first user 4a, a second user 4b, or other users) operating remotely away from the home network 2 may not be able to control the routing of the communications through various networks back to the home network 2. As such, in addition to providing chaff packets for the communication, the secure remote network environment 300 may also utilize a remote secure network 5 through which all of the remote users 4 will connect to send communications back to the home network 2. The remote secure network 5, as will be described in further detail herein, may provide one or more relays through which communications may be routed. As such, the remote secure network 5 directs the one or more wheat packets and the one or more chaff packets through multiple relays (e.g., the same or different routings) in order to hide not only the communication using the chaff packets described herein, but from which networks the communication originated and to which networks the communications are to be routed, as will be discussed in further detail herein with respect to FIG. 4.

FIG. 4 provides a process flow for providing secure communications from remote networks 3 (e.g., potentially unsecured networks 3) outside of the network 2 (e.g., home network 2) without encryption of the packets used for the communication. As illustrated in block 110 of FIG. 4, each of the systems 20 of the users 4 that will be communicating with the network 2 (e.g., home network 2) from remote networks 3 may be updated with an agent application. The agent application may include a pre-shared key. Additionally, the agent application of each of the systems 20 that will communicate with the network 2 (e.g., home network 2) from a remote network 3 may also have a pre-shared algorithm or at least an indication to utilize a type of algorithm to create signatures for the communications. The pre-shared key and algorithm may be utilized by the users 4 to communicate with the home network 2 from a remote network 3.

As illustrated in block 120 of FIG. 4, a sending system creates a plurality of packets for a communication with other systems, such as a receiving system on a home network 2, while the sending system is using a remote network 3 (e.g., a potentially unsecured network 3). The packets may contain the content of the communication, packet information (e.g., packet identifiers, or the like), the system to which the packets are to be sent, or other like information. The plurality of packets created by the sending system may comprise the one or more wheat packets and the one or more chaff packets, as previously described herein. The one or more wheat packets are the actual packets for the communication. As previously described herein, the wheat packets for a communication may be split up into a plurality of wheat packets in order to improve the security of the communication. The one or more chaff packets, as previously described herein, may comprise imitation packets that look like wheat packets, real packets for an unrelated communication (e.g., wheat packets for past or current unrelated communications on the network 2), or the like. When the agent application on the sending system creates the one or more chaff packets, the sending system may use a chaff packet algorithm (e.g., imitation packet generation, or the like). When the chaff packets are wheat packets from unrelated communications, the legitimate packets may be randomized (e.g., XORed, or the like with a log of network communications and/or salted using a pre-computed salt value, or the like).

Block 130 of FIG. 3 further illustrates that the sending system attaches a wheat signature to each of the one or more wheat packets. As previously described herein, the wheat signature may be created using the pre-shared key and the known algorithm (e.g., a pre-shared algorithm or pre-identified algorithm). Additionally, a section of the which packet, such as the content of the wheat packet, a serial number of the wheat packet, or the like, may also be used by the pre-shared algorithm to create the signature. Each signature created is attached to each wheat packet (e.g., different signatures are used on each wheat packet, or the like).

FIG. 3 further illustrates in block 140 that the one or more chaff signatures are attached to the one or more chaff packets. It should be understood that the chaff signatures may be imitation signatures that are similar to the wheat signatures (e.g., same length of characters, or the like) and are attached to the imitation chaff packets. Alternatively, the chaff signatures may comprise a modification of the original wheat signatures that are attached to the original wheat packets for other unrelated communications, which are now being used as chaff packets for the present communication. As described above with respect to the chaff packets themselves, the signature for the chaff packets may be randomized (e.g., XORed, or the like with a log of network communications and/or salted using a pre-computed salt value, or the like).

As illustrated in block 150 of FIG. 4, once the wheat packets and the chaff packets are created and/or identified from other sources and signed, the wheat packets and the chaff packets are sent to the one or more systems, such as the receiving systems on the home network 2. In some embodiments the wheat packets and the chaff packets are sent directly from the unsecured networks 3, on which the users 4 are located, to the home network 2 (e.g., in some embodiments using relays of other networks). Even though the packets are being sent without encryption and in plain text, the unsecured network 3 is unable to determine the communication because the unsecured network 3 (or a system on the unsecured network 3) is unable to determine what packets are the wheat packets and what packets are the chaff packets. That is, as will be described in further detail below with respect to block 195, the wheat packets and/or the chaff packets can only be determined by a system that has the pre-shared key, the known algorithm, and/or the correct section of the packet (e.g., content, serial number, or the like), such as a system on the home network 2 (e.g., authorized systems). That is, any system on the unsecured network 3, any systems on intermediary networks before the packets reach the home network 2, and/or any rogue systems on the home network 2, are unable to read the communication because these systems do not have the pre-shared key, algorithm (e.g., pre-shared algorithm) and/or the correct section of the packets. As such, it should be understood that the one or more packets may include the plain text of the communication, which is available for any system on any of the networks through which the packets are sent to read.

In some embodiments, it should be understood that the packets may be created within and/or routed through a secure remote network 5, as previously described with respect to FIG. 3 herein. That is, each user 4 (e.g., a first user 4a, a second user 4b, or the like) that is operating remotely may access a remote secure network 5 (e.g., log onto and create packets, send the packets through, or the like) and send the packets through the remote secure network 5 (e.g., operated by the organization that operates the home network 2, by a third-party, or the like). The remote secure network 5 randomizes the packets through various relays within the secure remote network 5, or accesses a network of secure remote networks 5, and then ultimately sends the packets to the home network 4 (e.g., the original destination).

With respect to the randomized routings, in some embodiments the initial relay in the remote secure network 5 may create the entire routing; however, in other embodiments each relay within the secure network 5 may be determined by each successive relay and/or each relay may randomly determine the next successive relay. In this way, each relay may only be aware of the previous relay from which the packets were received and the next relay to which the packets will be sent. Consequently, each relay, and thus each system trying to identify the routing, will not know the origination of the packets (e.g., the sending system) or the destination of the packets (e.g., the receiving system).

Consequently, in addition to using wheat packets and chaff packets, the secure remote network 5 may be utilized by each user 4 outside of the home network 2 in order to provide additional security around routing the packets from potential unsecure networks 3 to the home network 2. For example, since each user 4 is using the secure remote network 5, all of the packets being sent through the remote secure network 5 create additional wheat and chaff packets that make it difficult to identify the wheat from the chaff.

As illustrated by block 160 of FIG. 4, the receiving system receives the plurality of packets for the communication. The receiving system then determines a validated signature for each of the plurality of packets. That is, the receiving system replicates a received signature from each of the plurality of packets (e.g., a wheat signature attached to the wheat packet, a chaff signature attached to the chaff packet) by using the pre-shared key and algorithm and/or a portion of the packets (e.g., content, serial number, or the like) to determine what the received signature should be.

Block 170 of FIG. 4 further illustrates that when the validated signature meets the received signature from the packets, the packets are identified as wheat packets. That is, for example, when the recreated signature determined by the receiving system meets the received signature included with the packet, the packet is identified as a wheat packet. Alternatively, as illustrated by block 180 in FIG. 4, when the validated signature fails to meet the received signature from the packets, the packets are identified as chaff packets. That is, for example, when the recreated signature determined by the receiving system fails to meet the received signature included with the packets, the packet is identified as a chaff packet. When the packets are identified by the receiving system as chaff packets, the chaff packets are discarded by the receiving system.

Block 190 of FIG. 4 illustrates that the receiving system reads the one or more wheat packets to determine the communication. In some embodiments when a plurality of wheat packets (e.g., sub-packets) are identified, the receiving system reassembles the plurality of wheat packets together to form the communication. In some embodiments the wheat packets may have wheat packet identifiers (e.g., sequential characters, or the like) that may be used to reassemble the wheat packets. Alternatively, or additionally, the pre-shared key and/or the algorithm may be used to determine the order of the plurality of packets in order to read the communication.

FIG. 4 further illustrates in block 195 that the security system network environment 300 described herein prevents the networks and/or systems thereof, such as the unsecured networks 3 from reading any communications made by the users 4 (e.g., travelers) using the user computer systems 20 that are being sent back to the home network 2. It should be understood that when users 4 are operating on networks in some areas (e.g., some countries, or within some businesses), the networks may be unsecured networks 3. For example, some unsecured networks 3 may require the users 4 and/or user computer systems 20 to provide the unsecure network 3 (or systems operating the unsecure network 3) any encryption keys that are traditionally used to encrypt communications, and in particular, encrypt the text of the packets used to send the communications. However, since the packets are being sent in clear text, any encryption key provided to the unsecured network 3 and/or the system thereof, is useless. As such, without the pre-shared key and the algorithm the unsecured network 3 and/or any system operating thereon is unable to determine what packets are wheat packets and what packets are chaff packets. Furthermore, it should be understood that any other rogue system trying to identify the communication as it is being sent from the unsecured network 3 to the home network 2 would be unable to determine the correct communication because it also does not have the ability to determine the wheat packets from the chaff packets. Moreover, when the remote secure network 3 is utilized, the routing of the packets and/or the IP addresses of the sending system, receiving system, and/or relays for the packets may also be secured through the use of randomized routings. Consequently, the use of the remote secure network 3 provides additional security to the communication.

The present disclosure provides an improved way for systems to communicate back to a home network 2 from an unsecured network 3 without encrypting the content of the packets being sent for the communication. Moreover, the present disclosure provides an improved way to prevent systems on an unsecure network, systems on intermediate networks through which the communication is sent, and/or a rogue system on a home network 2 from determining the communication without having to encrypt the communication. The present disclosure improves the processing capacity, the memory, and the processing speeds typically required when each of the packets for a communication requires encryption. That is, typical encryption processes require more processing capacity and memory, and more processing time to encrypt and decrypt each communication over networks.

It should be understood, that the systems described herein may be configured to establish a communication link (e.g., electronic link, or the like) with each other in order to accomplish the steps of the processes described herein. The link may be an internal link within the same entity (e.g., within the same organization) or a link with the other entity systems. In some embodiments, the one or more systems may be configured for selectively monitoring the resource usage and availability. These feeds of resource usage and availability may be provided via wireless network path portions through the Internet. When the systems are not providing data, transforming data, transmitting the data, and/or creating reports, the systems need not be transmitting data over the Internet, although it could be. The systems and associated data for each of the systems may be made continuously available, however, continuously available does not necessarily mean that the systems actually continuously generate data, but that systems are continuously available to perform actions associated with the systems in real-time (i.e., within a few seconds, or the like) of receiving a request for it. In any case, the systems are continuously available to perform actions with respect to the data, in some cases in digitized data in Internet Protocol (IP) packet format. In response to continuously monitoring the real-time data feeds from the various systems, the systems may be configured to update activities associated with the systems, as described herein.

Moreover, it should be understood that the process flows described herein include transforming the data from the different systems (e.g., internally or externally) from the data format of the various systems to a data format for display on other systems. There are many ways in which data is converted within the computer environment. This may be seamless, as in the case of upgrading to a newer version of a computer program. Alternatively, the conversion may require processing by the use of a special conversion program, or it may involve a complex process of going through intermediary stages, or involving complex "exporting" and "importing" procedures, which may be converting to and from a tab-delimited or comma-separated text file. In some cases, a program may recognize several data file formats at the data input stage and then is also capable of storing the output data in a number of different formats. Such a program may be used to convert a file format. If the source format or target format is not recognized, then at times a third program may be available which permits the conversion to an intermediate format, which can then be reformatted.

As will be appreciated by one of skill in the art in view of this disclosure, embodiments of the invention may be embodied as an apparatus (e.g., a system, computer program product, and/or other device), a method, or a combination of the foregoing. Accordingly, embodiments of the invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the invention may take the form of a computer program product comprising a computer-usable storage medium having computer-usable program code/computer-readable instructions embodied in the medium (e.g., a non-transitory medium, or the like).

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the invention may be written in an object oriented, scripted or unscripted programming language such as Java, Pearl, Python, Smalltalk, C++ or the like. However, the computer program code/computer-readable instructions for carrying out operations of the invention may also be written in conventional procedural programming languages, such as the "C" programming language or similar programming languages.

Embodiments of the invention described above, with reference to flowchart illustrations and/or block diagrams of methods or apparatuses (the term "apparatus" including systems and computer program products), will be understood to include that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

Specific embodiments of the invention are described herein. Many modifications and other embodiments of the invention set forth herein will come to mind to one skilled in the art to which the invention pertains, having the benefit of the teachings presented in the foregoing descriptions and the associated drawings. Therefore, it is to be understood that the invention is not to be limited to the specific embodiments disclosed and that modifications and other embodiments and combinations of embodiments are intended to be included within the scope of the appended claims. Although specific terms are employed herein, they are used in a generic and descriptive sense only and not for purposes of limitation.

INCORPORATION BY REFERENCE

To supplement the present disclosure, this application further incorporates entirely by reference the following commonly assigned patent applications:

| U.S. patent application Ser. No. | Title | Filed On |
| --- | --- | --- |
| 16/890,564 | NETWORK SECURITY SYSTEM FOR ROGUE DEVICES | Concurrently herewith |
| 16/889,945 | DYNAMIC SEGMENTATION OF NETWORK TRAFFIC BY USE OF PRE-SHARED KEYS | Concurrently herewith |

What is claimed is:

1. A security system for securely receiving communications from outside of a first network, the system comprising:
one or more memories having computer readable code stored thereon; and
one or more processors operatively coupled to the one or more memories, wherein the one or more processors are configured to execute the computer readable code to:
provide a pre-shared key to a sending system on the first network, wherein the sending system is configured to communicate with one or more first systems on the first network from a second network, wherein the pre-shared key is provided to the sending system without encryption when the sending system is connected to the first network and before the sending system accesses the second network, and wherein the first network is a home network and the second network is an unsecured network, and wherein:
the sending system creates a plurality of packets for a communication, wherein the plurality of packets comprise one or more wheat packets each having a wheat signature or one or more chaff packets each having a chaff signature; and
wherein the plurality of packets for the communication are sent from the second network to the one or more first systems on the first network;

receive, by a receiving system of the first network, the plurality of packets for the communication, wherein the receiving system
  determines a validated signature for each of the plurality of packets;
  identifies the one or more chaff packets when the one or more chaff packets have the chaff signature that fails to meet the validated signature and discarding the one or more chaff packets;
  identifies the one or more wheat packets when the one or more wheat packets have the wheat signature that meets the validated signature; and
  determines the communication from the sending system from the one or more wheat packets;
wherein one or more second systems on the second network are prevented from determining the communication from the sending system without the validated signature and without identifying the one or more wheat packets or the one or more chaff packets from the plurality of packets.

2. The system of claim 1, wherein determining the validated signature comprises replicating a received signature for the plurality of packets, wherein the received signature is the chaff signature of the one or more chaff packets or the wheat signature of the one or more wheat packets.

3. The system of claim 2, wherein the received signature comprises a message authentication code (MAC), and wherein replicating the MAC comprises:
  using the pre-shared key and an algorithm to create the validated signature.

4. The system of claim 3, wherein the algorithm is a pre-shared algorithm that is shared with the sending system when the sending system is on the first network.

5. The system of claim 3, wherein replicating the received signature further comprises:
  using at least a portion of the plurality of packets to create the validated signature.

6. The system of claim 1, wherein the sending system creates the wheat signature for the one or more wheat packets.

7. The system of claim 1, wherein the wheat signature is created from the pre-shared key, an algorithm, and a portion of a wheat packet of the one or more wheat packets.

8. The system of claim 1, wherein the sending system creates the one or more chaff packets using imitation content and imitation signatures.

9. The system of claim 8, wherein the one or more chaff packets appear to be related to a legitimate communication.

10. The system of claim 1, wherein the sending system creates the one or more chaff packets using content and validated signatures from one or more unrelated communications.

11. The system of claim 10, wherein the one or more chaff packets are from legitimate communications.

12. The system of claim 1, wherein the plurality of packets for the communication are sent from the second network to the one or more first systems on the first network through a remote secure network.

13. The system of claim 12, wherein the plurality of packets for the communication are sent from the remote secure network using a randomized routing of the plurality of packets.

14. A computer implemented method for securely receiving communications from outside of a first network using, the method comprising:
  providing, by one or more processing devices, a pre-shared key to a sending system on the first network, wherein the sending system is configured to communicate with one or more first systems on the first network from a second network, wherein the pre-shared key is provided to the sending system without encryption when the sending system is connected to the first network and before the sending system accesses the second network, and wherein the first network is a home network and the second network is an unsecured network, and wherein:
    the sending system creates a plurality of packets for a communication, wherein the plurality of packets comprise one or more wheat packets each having a wheat signature or one or more chaff packets each having a chaff signature; and
    wherein the plurality of packets for the communication are sent from the second network to the one or more first systems on the first network;
  receiving, by a receiving system, the plurality of packets for the communication, wherein one or more processing devices of the receiving system are configured to execute computer readable code to:
    determine a validated signature for each of the plurality of packets;
    identify the one or more chaff packets when the one or more chaff packets have the chaff signature that fails to meet the validated signature and discarding the one or more chaff packets;
    identify the one or more wheat packets when the one or more wheat packets have the wheat signature that meets the validated signature; and
    determine the communication from the sending system from the one or more wheat packets;
  wherein one or more second systems on the second network are prevented from determining the communication from the sending system without the validated signature and without identifying the one or more wheat packets or the one or more chaff packets from the plurality of packets.

15. The method of claim 14, wherein determining the validated signature comprises replicating a received signature for the plurality of packets, wherein the received signature is the chaff signature of the one or more chaff packets or the wheat signature of the one or more wheat packets.

16. The method of claim 15, wherein the received signature comprises a message authentication code (MAC), and wherein replicating the MAC comprises:
  using the pre-shared key and an algorithm to create the validated signature.

17. The method of claim 16, wherein the algorithm is a pre-shared algorithm that is shared with the sending system when the sending system is on the first network.

18. The method of claim 16, wherein replicating the received signature further comprises:
  using at least a portion of the plurality of packets to create the validated signature.

19. The method of claim 14, wherein the plurality of packets for the communication are sent from the second network to the one or more first systems on the first network through a remote secure network.

20. A computer program product for securely receiving communications from outside of a first network, the computer program product comprising at least one non-transitory computer-readable medium having computer-readable program code portions embodied therein, the computer-readable program code portions comprising:

an executable portion configure to provide a pre-shared key to a sending system on the first network, wherein the sending system is configured to communicate with one or more first systems on the first network from a second network, wherein the pre-shared key is provided to the sending system without encryption when the sending system is connected to the first network and before the sending system accesses the second network, and wherein the first network is a home network and the second network is an unsecured network, and wherein:
  the sending system creates a plurality of packets for a communication, wherein the plurality of packets comprise one or more wheat packets each having a wheat signature or one or more chaff packets each having a chaff signature; and
  wherein the plurality of packets for the communication are sent from the second network to the one or more first systems on the first network;
an executable portion configure to allow a receiving system to receive the plurality of packets for the communication, wherein one or more processing devices of the receiving system are configured to execute computer readable code to:
  determine a validated signature for each of the plurality of packets;
  identify the one or more chaff packets when the one or more chaff packets have the chaff signature that fails to meet the validated signature and discarding the one or more chaff packets;
  identify the one or more wheat packets when the one or more wheat packets have the wheat signature that meets the validated signature; and
  determine the communication from the sending system from the one or more wheat packets;
wherein one or more second systems on the second network are prevented from determining the communication from the sending system without the validated signature and without identifying the one or more wheat packets or the one or more chaff packets from the plurality of packets.

* * * * *